United States Patent [19]

Daws et al.

[11] 4,441,367
[45] Apr. 10, 1984

[54] APPARATUS FOR DETERMINING FABRIC TENSION

[75] Inventors: John W. Daws; Hugh W. Bradley, Jr.; Sheldon A. Canfield, all of Newark, Ohio

[73] Assignee: Owens-Corning Fiberglas Corporation, Toledo, Ohio

[21] Appl. No.: 299,234

[22] Filed: Sep. 3, 1981

[51] Int. Cl.³ .......................... G01H 5/00; G01L 5/10
[52] U.S. Cl. ........................................ 73/597; 73/159; 73/862.39
[58] Field of Search .................. 73/DIG. 1, 581, 584, 73/597, 862.39, 862.41, 159

[56] References Cited

U.S. PATENT DOCUMENTS 4,073,007  2/1978  Boivin ............................... 73/584 X
4,177,798  12/1979  Leveque et al. ....................... 73/584

OTHER PUBLICATIONS

Hashmi et al., Journal of the Acoustical Society of America, vol. 31, No. 10, Oct. 1959, p. 1384.

Primary Examiner—Charles A. Ruehl
Attorney, Agent, or Firm—Ronald C. Hudgens; Patrick P. Pacella; Ronald E. Champion

[57] ABSTRACT

A frame for being seated upon the fabric carries first and second spaced apart sensors capable of detecting the leading front of an acceleration wave as it passes each sensor. The first and second sensors each have an output, responsive to the presence of the acceleration wave, which can be coupled to a timer for measuring the time of flight of the acceleration wave between the two sensors. The velocity of the acceleration wave being determined by dividing the time of flight by the distance separating the sensors. An acceleration wave generating mechanism may also be carried by the frame and can include a solenoid oriented so that its armature impacts the fabric perpendicular thereto. Preferably the solenoid is energized by a pulse controlled by a solenoid energizing circuit. A noise immunity circuit connected to the sensors aids in discriminating against noise and transients.

13 Claims, 5 Drawing Figures

APPARATUS FOR DETERMINING FABRIC TENSION

BACKGROUND OF THE INVENTION

This invention relates generally to the field of fabric tension measurement and more specifically to the measurement of the propagation velocity of an acceleration wave in fabric under tension enabling the tension to be calculated based upon the velocity.

Fabric is typically constructed having a plurality of parallel warp threads running the length of the fabric in which is interwoven a plurality of perpendicular fill threads. The threads can be made from a variety of materials including thermoplastic strands. The fabric may be treated or coated to impart certain desirable characteristics.

In certain applications it may be desirable to utilize fabric as a structural element by stretching the fabric over a framework to cover an expanse such as in a tent construction. When fabric is placed under tension, it is desirable to know the vector tension existing in the warp and fill directions to determine the forces acting on the fabric. In applications where the forces acting upon the fabric can be controlled, such as in a tent, the fabric tension can be adjusted to a safe operating value. In applications where the forces acting upon the fabric cannot be conveniently controlled, it is still important to know the tension in order to determine if the fabric is operating within safe limits and to determine what additional loading could be safely accommodated. Therefore, it will be apparent that there exists a need for an apparatus which can accurately measure warp and fill tension in stretched fabric constructions.

The tension in stretched fabric can be calculated from the equation $F = V^2 D$, wherein F is the tension (force) per unit length, V is propagation velocity of an acceleration wave in the fabric in either the warp or fill direction, and D is the density per unit area of the fabric. Since the density per unit area of the fabric can be easily determined, only the measure of the velocity poses a problem. It should be noted that the above equation is valid only for the propagation velocity of an acceleration wave, such as produced by an acceleration discontinuity in the fabric, along the warp or fill axes.

SUMMARY OF THE INVENTION

It is an object of the present invention to provide a portable hand held apparatus for producing an acceleration wave in a tensioned piece of fabric and for sensing the propagation of the acceleration wave produced.

Another object of the present invention is to provide first and second spaced apart sensors for detecting the propagation of the acceleration wave.

A still further object of the present invention is to provide a counter for determining the time it takes the acceleration wave to travel from the first sensor to the second sensor thereby enabling the velocity of the wave to be computed.

An additional object of the present invention is to provide a means for discriminating against noise and spurious responses, that is, sensor responses not representing the presence of an acceleration wave.

The preferred embodiment of the present invention includes a frame for being seated upon the fabric, a means carried by the frame for generating an acceleration wave in the fabric, and first and second spaced apart sensors carried by the frame capable of at least detecting the leading front of the acceleration wave as it passes each sensor. The first and second sensors each have an output, responsive to the presence of the acceleration wave, which is coupled to a counter for measuring the time of flight of the acceleration wave between the two sensors. The velocity of the acceleration wave can be determined by dividing the time of flight by the distance separating the sensors. The acceleration wave generating means may include a solenoid oriented so that its armature impacts the fabric perpendicular thereto. Preferably the solenoid is energized by a pulse which terminates prior to the armature impacting the fabric. A spurious signal detector may be coupled to each sensor to discriminate against noise and transient responses.

DETAILED DESCRIPTION

This specification discloses a portable handpiece for being seated upon an expanse of stretched fabric. It may include a solenoid that can sharply strike the fabric to produce an outwardly traveling wave in the fabric. Two spaced apart transducers pivotally mounted to the handpiece sense this wave and have outputs responsive to the wave. Electrical circuits control the activation of the solenoid and utilize the outputs of the transducers to determine the time required for the wave to travel from one transducer to the other. The velocity of the wave is defined by the travel time and distance between transducers.

Figure 1:
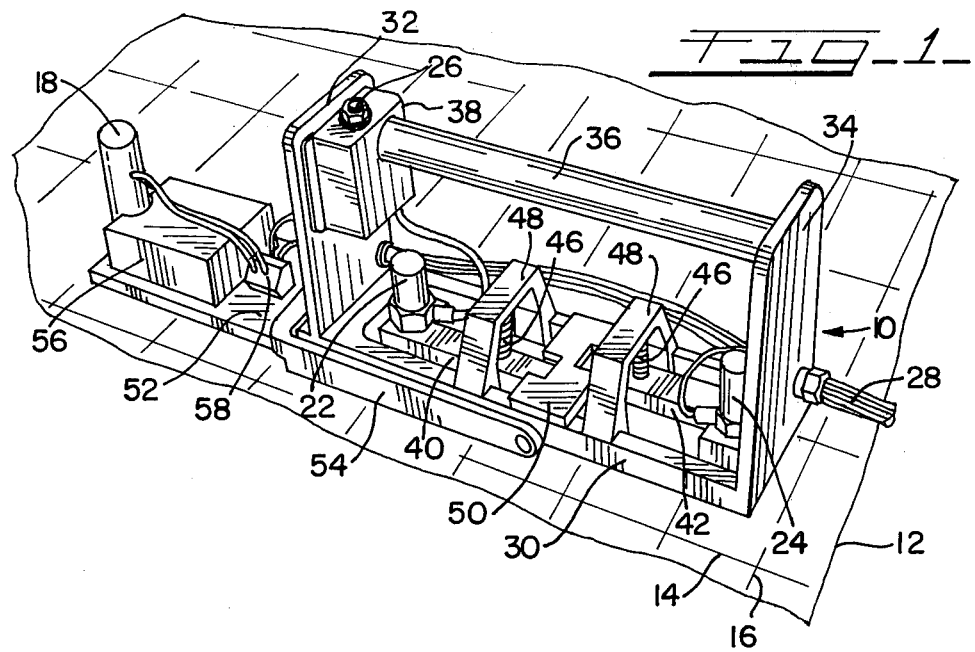
FIG. 1 illustrates a perspective view of an embodiment of the present invention seated in an operative position on an expanse of tensioned fabric.
Figure 2:
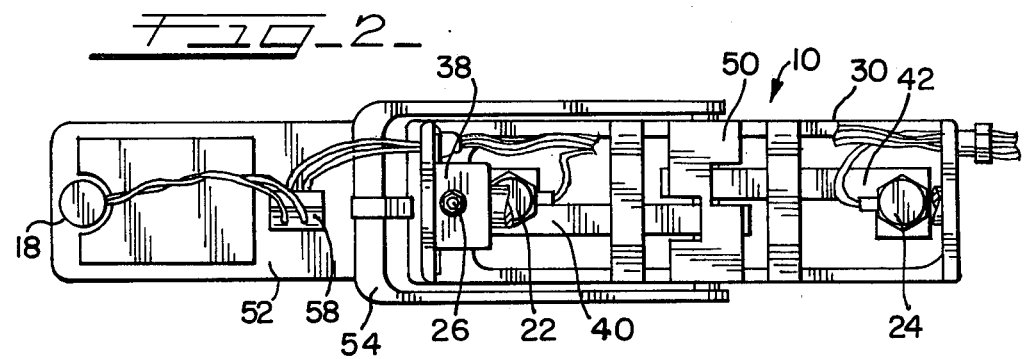
FIG. 2 is a top view of the embodiment of the present invention as shown in FIG. 1.
Figure 3:
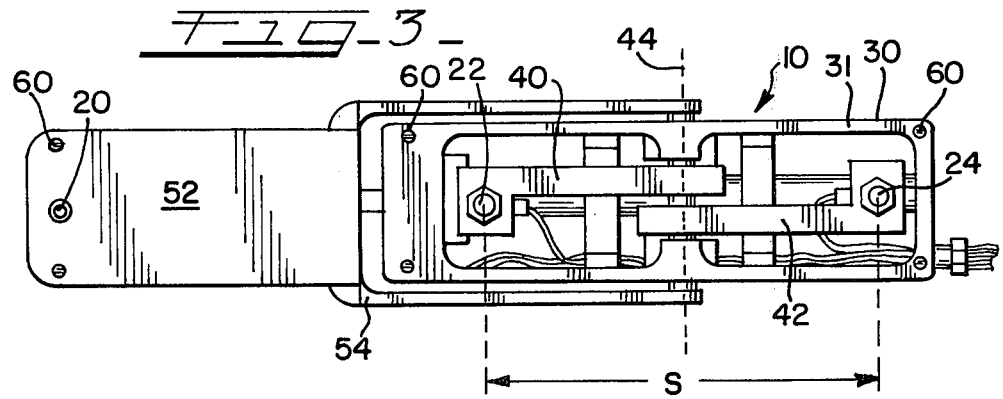
FIG. 3 is a bottom view of the present invention as shown in FIG. 1.

FIGS. 1, 2 and 3 illustrate an embodiment of a hand held frame 10 capable of generating an acceleration discontinuity in fabric 12 and sensing the propagation of the resulting acceleration wave. The fabric has a plurality of warp threads 14 and fill threads 16 which are shown in FIG. 1 with exagerated spacings. The framework 10 is seated upon fabric 12 such that its longitudinal axis is parallel to the warp threads. This orientation is utilized to measure tension in the fabric in the warp direction. Rotating the framework 90° such that its longitudinal axis parallels the fill threads permits measurement of the fabric tension in the fill direction.

A solenoid 18 mounted to the framework provides a means for generating an acceleration wave in fabric 12. The armature 20 of the solenoid is normally spring biased in a retracted or generally upward position, with reference to FIG. 1, so that it is adjacent but not engaging the surface of the fabric. Transducers 22 and 24, which are preferably accelerometers, are mounted to the framework so as to ride upon the surface of the fabric 12 and provide a means for sensing the acceleration wave front which travels radially outwardly from the point of the acceleration discontinuity generated by armature 20 of the solenoid impacting the fabric. A push button 26 is used to control the firing or energizing of the solenoid. The wires associated with the solenoid, accelerometers and push button are routed along the framework and exit as a single multiconductor cable 28 which connects these components with remotely situated circuitry which will be described in detail below.

The framework 10 includes a rectangular base 30 to which is mounted a front wall 32 and a rear wall 34. A cylindrical handle 36 is mounted between the front and rear walls and allows the framework to be easily positioned or moved with one hand. A housing 38 mounted to front wall 32 protects pushbutton switch 26. It will be noted that the push button switch is positioned such that it can be activated while holding handle 36 thus requiring only one hand to operate the framework of this invention.

Accelerometers 22 and 24 are mounted near the ends of arms 40 and 42, respectively. These arms are mounted near their other ends to base 30 so that each arm pivots about a common axis indicated by dotted line 44. Arms 40 and 42 are urged downwardly by springs 46 acting against bridge members 48 which are attached to base 30. The combined weight of the accelerometers and the supporting arms together with the force applied by the springs keep the accelerometers in contact with the surface of the fabric. A plate 50 which is secured to base 30 is dimensioned to function as a stop to limit the upward and downward movement of the accelerometers. This maintains the accelerometers in an acceptable position when the framework is being carried.

Solenoid 18 is mounted near the end of support plate 52 which is in turn mounted to U-shaped bracket 54, together forming a first arm, which is pivotally mounted to base 30 along axis 44. This permits solenoid 18, plate 52 and bracket 54 to pivot generally clockwise, see FIG. 1, due to the recoil which will be produced upon firing the solenoid to produce the acceleration discontinuity. A block 56 on plate 52 provides additional mass to affect the division of energy between the armature and the stator of solenoid 18. A terminal block 58 is used to connect the solenoid with the cable 28. Generally cylindrical feet 60 support the plate 52 and base 30 when the framework is seated upon the surface of fabric 12.

It is important that the solenoid be mounted to the framework so that the accelerometers are substantially decoupled from the solenoid, that is, so that the recoil of the solenoid does not significantly influence the accelerometers. By pivotally mounting the solenoid by means of the U-shaped bracket along the same axis about which the accelerometers pivot, the solenoid recoil or kickback is substantially decoupled from the accelerometers. To the extent that the accelerometers may experience a small amount of coupling due to the recoil, each accelerometer should be equally effected thus permitting such a response to be easily recognized.

The framework 10 may be generally constructed from any suitable material such as stainless steel. The base 30 may be approximately 8 inches (20 cm) long and 2.5 inches (6.25 cm) wide; plate 52 may be approximately 5 inches (12.5 cm) long. The spacing S between the accelerometers must be known in order to calculate the propagation velocity of the acceleration wave. A spacing S of 6.0 inches (15 cm) has proved to be suitable when accelerometer 22 is approximately 6.0 inches (15 cm) from armature 20. The total weight of framework 10 for the specific embodiment and dimensions as given may be approximately 4 pounds (1.8 kilograms).

Figure 4:
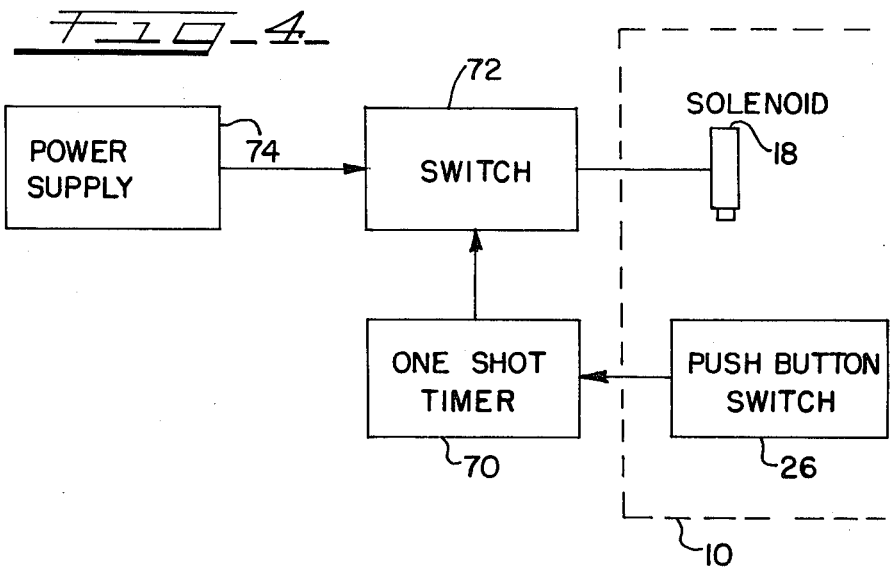
FIG. 4 is a block diagram illustrating circuitry used to generate an energized pulse for the solenoid which produces an acceleration wave.

FIG. 4 illustrates the circuitry used to control solenoid 18. The solenoid and push button switch 26 are mounted to the framework 10 as indicated by the dashed line. The push button switch triggers a one shot timer 70 having a preselected time period. A series switch 72, which may consist of a series pass transistor, is used to energize solenoid 18 by supplying it with energy from power supply 74 during the one shot time period. The one shot time period is selected based upon the response time of the solenoid so that switch 72 is turned off just prior to the armature of the solenoid impacting upon the surface of the fabric. Thus, the armature of the solenoid will be "coasting" due to momentum at the instant of impact and will be free to rebound so that only a single impulse striking force is applied to the fabric to create an acceleration discontinuity. The energy available from the power supply, the response characteristics of the solenoid, and the time period of the one shot timer cooperate to achieve this desired result.

Figure 5:
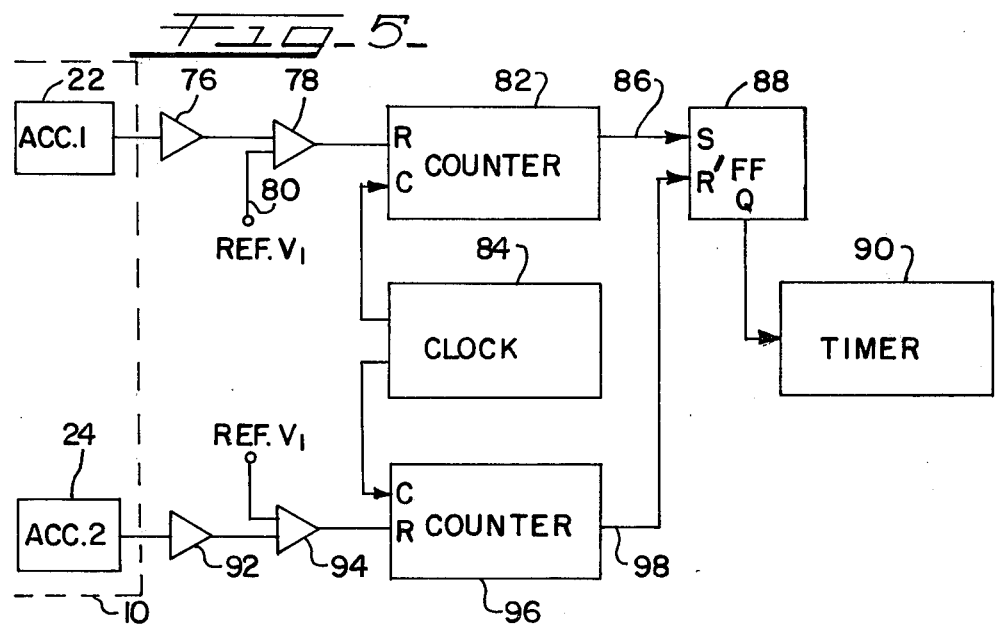
FIG. 5 illustrates a block diagram of a circuit used to measure the time of flight of the acceleration wave.

FIG. 5 illustrates circuitry for measuring the time of flight of the acceleration wave in response to the outputs of accelerometers 22 and 24 which are mounted to framework 10 as indicated. The output of accelerometer 22 is a voltage proportional to its acceleration which is amplified by amplifier 76 and applied to the input of a comparator 78. The reference input 80 of the comparator which determines the switching threshold is adjusted such that minor noise variations at the output of amplifier 76 will not trigger the comparator. Additional noise and transient immunity is provided by counter 82 and clock 84. The output of the comparator is connected to the reset input R of a conventional binary counter 82 having its clock input C driven by free running clock or oscillator 84 which has a fixed frequency. The clock and counter combination function as a delay circuit having a preset delay dependent upon the clock frequency and the number the counter is selected to count. The comparator output must remain in a state indicative of accelerometer 22 sensing the presence of an acceleration wave for a period of time longer than the delay time of the counter for the output 86 of counter 82 to change state. If the comparator output returns to its nondetecting state before the time period of the delay circuit has elapsed, the counter is reset to zero. Noise, transient, and spurious signals typically have a time duration less then that selected for the time delay of counter 82 and thus will be discriminated against. The output 86 of the counter 82 is connected to the set input S of flip flop 88. When output 86 changes state, the flip flop output Q also changes state allowing timer 90 to start. Timer 90 may be a conventional electronic timer (counter) having a digital display.

The amplifier 92, comparator 94 and counter 96 associated with accelerometer 24 function in the same manner as amplifier 76, comparator 78, and counter 82. Output 98 of counter 96 is connected to the reset input R' of flip flop 88 causing it to be reset thereby stopping timer 90. Thus, timer 90 contains the time interval required for the acceleration wave to propagate from accelerometer 22 to accelerometer 24. Since identical delays are selected for counters 82 and 96, the delays cancel thereby not effecting the accuracy of the time interval determined by timer 90. Since the magnitude of the acceleration wave decays as it travels outwardly, its magnitude as sensed by accelerometer 24 will be less than that sensed by accelerometer 22. The gain of amplifiers 76 and 92 are preferably adjusted so that the associated comparators will be triggered by the same phase angle of the wave.

For a spacing of 6 inches (15 cm) between accelerometers counters 82 and 96 may be conventional divide by 512 binary counters and the frequency of clock 84 may be 1.0 MHz thereby providing a time delay of 0.512 milliseconds. This represents a suitable time delay for times in the 1–6 ms range which were measured in tests which were performed on tent fabrics. Of course, the delay time must be shorter then the time interval during which the accelerometer is responsive to the presence of the acceleration wave. Timer 90 can be either manually reset or automatically reset at the start of a new test in response to push button switch 26.

The time interval measured by timer 90 when divided by the spacing S between accelerometers equals the propagation velocity V of the acceleration wave. Therefore, in accordance with the equation $F=V^2D$ the tension in the warp or fill directions can be readily determined. Preferably for a given location on the fabric both the warp and the fill tensions will be measured. It will be apparent to those skilled in the art in light of this teaching that the tension F can be computed automatically, such as by using a computer or microprocessor. Since the distance between the accelerometers and density per unit area remain constant, this data need only be entered once in such an automatic system. The time T can be transferred in digital form from the timer 90 to the computer for each test.

The present invention allows a large number of tests to be conducted in a relatively short time period because of the convenient and easy manner with which the framework 10 can be handled and the reliable processing of the output of the accelerometers. Although accelerometers have been used in the specific embodiment of the present invention as illustrated other transducers capable of detecting an acceleration wave could be employed. Because of the mass of the accelerometers and arms which support them, the accelerometers do not respond quickly enough to follow each of the decreasing magnitude waves produced by the discontinuity. However, the accelerometers do respond to the leading or front wave which is all that is required to make an accurate measurement.

Other types of noise and transient immunity circuits could be utilized based upon a continuous preselected minimum recognition time concept. Also alternate ways of mounting a solenoid or other acceleration wave generating device to the framework could be implemented.

While an embodiment of the present invention has been described above and illustrated in the drawings, the scope of the present invention is defined by the claims appended hereto.

That which is claimed is:

1. An apparatus for generating an acceleration wave in a stretched woven fabric and for sensing the propagation of same comprising:
   (a) an articulated frame for being disposed adjacent said fabric;
   (b) a means carried by a first arm of the frame for generating an acceleration wave in the fabric;
   (c) a first means carried by a second arm of the frame for contacting the fabric and sensing at least the leading front of said wave and having a first output responsive thereto;
   (d) a second means carried by a third arm of the frame for contacting the fabric and sensing at least the leading front of said wave and having a second output responsive thereto;
   (e) said generating means, first means and second means disposed along a common axis with a distance S separating said first and second means;
   (f) said first arm, second arm and third arm being pivotally mounted to the frame along a common axis of rotation perpendicular to the axis formed by said first sensing means and said second sensing means,
   whereby an accelerating wave is produced by said generating means and the propagation of said wave sensed by said first and second means.

2. The apparatus according to claim 1 wherein said generating means comprises a solenoid having an armature, said solenoid disposed such that the armature, when the solenoid is energized, projects toward and strikes said fabric.

3. The apparatus according to claim 2 further comprising a means for energizing said solenoid for a predetermined time period so that said armature strikes the fabric only a single time therein approximating an impulse force.

4. The apparatus according to claim 3 wherein said predetermined time period is selected so that same terminates prior to the armature striking the fabric whereby the momentum of the armature carries the latter into contact with the fabric.

5. The apparatus according to claim 3 wherein said energizing means comprises a power supply, a series switch connected between the power supply and said solenoid, a one shot timing circuit connected to said series switch for controlling the time period during which said switch is closed, and a manually operable switch connected to said one shot timing circuit for triggering same, whereby said predetermined time period is controlled by the one shot timing circuit.

6. The apparatus according to claim 1 further comprising a timing means coupled to said first and second outputs for measuring the time T required for said wave to travel from said first sensing means to said second sensing means whereby the propagation velocity of said acceleration wave may be calculated by dividing distance S by time T.

7. The apparatus according to claim 6 further comprising first and second noise immunity circuits connected respectively to said first and second outputs and coupled to said timing means.

8. The apparatus according to claim 7 wherein said first and second noise immunity circuits each comprise a comparator, a time delay means coupled to said comparator for providing a third output which changes state only upon the comparator continuously remaining in a state indicative of the sensing of an acceleration wave for a preset delay, whereby noise and transient signals having a time duration shorter than said preset delay will be discriminated against.

9. The apparatus according to claim 8 wherein said time delay means comprises a binary counter connected to said comparator for counting a preselected number of counts, and a clock having a fixed frequency connected to said binary counter wherein said preset delay is determined by said frequency and said preselected number of counts.

10. The apparatus according to claim 8 further comprising a flip-flop having set and reset inputs connected to said first and second noise immunity circuits, respectively, and having its output connected to said timing means for controlling same.

11. The apparatus according to claim 6, wherein said timing means comprises an electronic timer for measuring the time T it takes said acceleration wave to travel from said first sensing means to said second sensing means.

12. An apparatus for measuring the propagation velocity of an acceleration wave in a stretched woven fabric comprising:
 (a) a hand carryable articulated frame for being seated upon and contacting said fabric;
 (b) a first means carried by a first pivotable arm of the frame for contacting said fabric and sensing at least the leading front of said wave and having a first output responsive thereto;
 (c) a second means carried by a second pivotable arm of the frame for contacting said fabric and sensing at least the leading front of said wave and having a second output responsive thereto, said first means and second means separated by a distance S and said first pivotable arm and said second pivotable arm having a common axis of rotation; and
 (d) a timing means coupled to said first and second outputs for measuring the time T it takes said wave to travel from said first sensing means to said second sensing means,
 whereby the propagation velocity V of said acceleration wave can be computed from the equation $V=S/T$.

13. In a system for determining the tension F in a stretched woven fabric having a known density per unit area D by measuring the velocity V of an acceleration wave in said fabric wherein $F=V^2D$, the improvement in an apparatus for measuring V comprising:
 (a) an articulated frame for being disposed adjacent said fabric;
 (b) a means carried by a first arm of the frame for generating an acceleration wave in the fabric;
 (c) a first means carried by a second arm of the frame for contacting the fabric and sensing at least the leading front of said wave and having a first output responsive thereto;
 (d) a second means carried by a third arm of the frame for contacting the fabric and sensing at least the leading front of said wave and having a second output responsive thereto, said generating means, first means and second means disposed substantially along a common axis, said first and second means separated by a distance S;
 (e) said first arm, second arm and third arm being pivotally mounted to the frame along a common axis of rotation perpendicular to the axis formed by said first sensing means and said second sensing means; and
 (f) a timing means coupled to said first and second outputs for measuring the time T it takes said wave to travel from said first sensing means to said second sensing means,
 whereby the propagation velocity of said acceleration wave can be computed from the equation $V=S/T$ and the tension F determined from the equation $F=V^2D$.

* * * * *